United States Patent Office 3,725,269
Patented Apr. 3, 1973

3,725,269
METHOD OF DECONTAMINATING AN ORGANO-PHOSPHORUS INSECTICIDE
Billy C. Wolverton, Picayune, Miss., assignor to the United States of America as represented by the Secretary of the Air Force
No Drawing. Filed Nov. 24, 1971, Ser. No. 201,951
Int. Cl. C02c 5/02
U.S. Cl. 210—59      2 Claims

ABSTRACT OF THE DISCLOSURE

A solution for decontaminating and converting selected organophosphorus insecticides into products which can be water washed and discharged into streams without the usual toxic effects to fish normally exhibited by unaltered insecticides.

BACKGROUND OF THE INVENTION

(1) Field of the invention

This invention relates to a solution and the method of using the same to decontaminate certain organophosphorus insecticides. The organophosphorus insecticides have rapidly gained public acceptance because of their wide spectrum of insecticidal effectiveness and the ease at which they can be degraded by environmental factors such as soil, water and vegetation. These insecticides normally do not persist in the environment more than several weeks, whereas chlorinated insecticides such as DDT persist for years, even under adverse environmental conditions.

The effective, nonpersistent nature of organophosphorus insecticides makes them ideal for both civilian and military insecticide programs. However, formulations of the highly active concentrates of these insecticides for ultra-low-volume aerial applications and other applications require special precautions during filling and handling operations. To reduce the risk of accidental exposure of workers and avoid environmental pollution, a rapid-acting, noncorrosive decontaminating solution is highly desirable when working with these insecticide concentrates.

(2) Description of the prior art

Various formulations and methods have been employed to reduce, neutralize or decontaminate general poisons of biocides such as insecticides miticides, etc. Representative of such from the prior art is U.S. Pat. No. 3,314,851 to Craig.

SUMMARY OF THE INVENTION

The present invention resides in the use of a solution of monoethanolamine (MEA) in dipropylene glycol monomethyl ether (DPGME) to which the organophosphorus insecticide is exposed. The insecticide can be described as being of two types of organophosphorus compounds, namely, sulfur containing as represented by malathion which is O,O-dimethyl S-bis (carbethoxy) ethyl phosphorodithioate and the nonsulfur containing as illustrated by naled which is 1,2-dibromo-2,2 dichloroethyl dimethyl phosphate (dibrom). Further illustrative of the nonsulfur containing organophosphorus insecticides are TEPP, which is tetraethylpyrophosphate, and DDVP, which is dimethyldichlorovinylphosphate (dichlorvos).

DESCRIPTION OF THE PREFERRED EMBODIMENTS

The decontamination procedure involves exposing the insecticide. For the decontamination of naled, solutions to-volume ratio of 10 parts decontaminant to one part insecticide. Fr the decontamination of naled, solutions containing 12.5% MEA were used. Solutions formulated with 25% MEA were used to decontaminate malathion and dichlorovos. The reactions were allowed to proceed at room temperature for 30, 60, 120, and 240 minutes. At the end of each time period, the unaltered insecticides were extracted and assayed by gas chromatography. All experiments were performed in triplicate.

The extraction procedure was effected by adding the decontaminant mixture to 50 ml. distilled water in a 250 ml. separatory funnel. The unaltered insecticides were extracted from the aqueous mixture with 30 ml. hexanes which were added in 10 ml. aliquots. To aid in the separation of the hexanes and aqueous layers, 15 ml. of a saturated sodium chloride solution were added. The hexane layer was placed over 10 grams anhydrous sodium sulfate. The extract was filtered and stored at 5° C. if the sample could not be readily analyzed on the gas chromatograph. To test the efficiency of the extraction scheme, insecticides were exposed to dipropylene glycol monomethyl ether in the absence of MEA. This mixture was subjected to the same extraction procedure as the decontaminated mixture.

Gas-liquid chromatography was used for the detection of unaltered insecticides. A Tractor MT-220 gas chromatograph equipped with a flame photometric detector was employed. A 6 foot by ¼ inch glass column containing Chromosorb "W," 80/100 mesh, coated with 10% Dow 200 was conditioned for 48 hours at 200° C. before use. This column was used for the analysis of malathion. The inlet temperature was held at 175° C., the column-oven temperature at 170° C., and the detector temperature at 190° C. For the analysis of naled, TEP, and dichlorvos, a 6 foot by ¼ inch glass column containing Chromosorb "G," 100/120 mesh, coated with 2% SF-96 was used. This column was conditioned at 225° C. for 36 hours prior to use. The injector temperature was maintained at 185° C., the column-oven temperature at 175° C., and the detector temperature at 190° C. Gas flow rates for all gas chromatographic analyses were helium 65 cc./minute, hydrogen 180 cc./minute, oxygen 25 cc./minute, and air 90 cc./minute. Peaks obtained from the decontamination mixture extracts were compared with calibrated peaks obtained from a known concentration of insecticides in hexanes.

Fish toxicity studies were performed to obtain acute median tolerance limit (TLm) in accordance with the routine bioassay method. (Standard Methods for the Examination of Water and Wastewater. Part IV. Bioassay methods for the evaluation of acute toxicity of industrial wastewater and substances to fish. American Public Health Association, Inc. Boyd Printing Co., Inc., New York, 1965, pp. 457–475.) The test species, mosquito fish (*Gambusia affinis,* Baird and Girard) was seined from ponds of Eglin AFB Reservation, Florida. The mosquito-fish, total length 20–30 mm., were acclimatized in the laboratory in rectangular 10-gallon holding tanks for a minimum of 10 days before they were used. Water temperature in holding tanks and test containers was maintained at 22° C. Test animals were fed Fish Food daily. None were fasted prior to testing. Test containers were cylindrical 4.5-gallon laboratory glass jars, each housing 10 fish. Water temperature was maintained at 22° C. and water depth at 250 mm. Between tests, containers were washed with detergent and rinsed with acetone. Test animals were observed hourly for the first eight hours, and at 24-hour intervals thereafter throughout the 96 hours of observation. TLm values were determined by the Reed-Muench Method. (D. J. Finney, Statistical Method in Biological Assay. 2nd ed. Hafner Publishing Co., New York, 1965, pp. 533–535).

Insecticides used in this study were malathion, technical (95%), American Cyanamid Co.; naled, technical (85%), Chevron Chemical Co.; dichlorvos, technical grade, Shell Chemical Co.; and TEPP, technical (100% active ingredients), Miller Chemical and Fertilizer Corp. Chemicals used in the decontaminating solution were dipropylene glycol monomethyl ether, reagent grade, Dow Chemical Co., and purified monoethanolamine from Fisher Scientific Co. Chemicals for the extraction procedure included hexanes (Fisher Scientific Co.), certified for pesticide residue analysis, a saturated U.S.P. grade sodium chloride solution, and anhydrous sodium sulfate, certified ACS grade.

The gas chromatography data demonstrate that the decontaminating solution is effective in neutralizing the insecticides studied. Although neutralization rates differ widely, naled is destroyed completely after 30 minutes and most of the malathion in 60 minutes (Table 1).

TABLE 1.—PERCENT INSECTICIDE REMAINING AFTER EXPOSURE TO DEDECONTAMINATING SOLUTIONS

| Compound | 0 min. | 30 min. | 60 min. | 102 min |
|---|---|---|---|---|
| Malathion: 15% MEA in DPGME | 100.00 | 35.0 | 16.9 | 1.3 |
| Malathion: 25% MEA in DPGME | 100.00 | 19.6 | 2.4 | 0.1 |
| Naled: 12.5% MEA in DPGME | 100.00 | 0.1 | 0.1 | 0.1 |
| Dichlorvos:12.5% MEA in DPGME | 100.00 | 5.3 | | |
| Dichlorvos:25% MEA in DPGME | 100.00 | 0.1 | 0.1 | 0.1 |
| TEPP:12.5% MEA in DPGME | 100.00 | 0 | 0 | 0 |

The above results were also confirmed by thin-layer chromatography.

Data obtained from fish studies indicate that the MEA decontaminating solution is highly effective in neutralizing the toxic effects of naled and malathion when 10 parts of the decontaminating solution are allowed to react with one part of the insecticide for approximately one hour. The data shown in Table 2 suggest that the mixture containing both insecticides and decontaminating solutions is less toxic to fish than the decontaminating solution alone, which already is relatively nontoxic.

TABLE 2.—TLm VALUES IN PARTS PER MILLION (P.P.M.) FOR MOSQUITOFISH (GAMBUSIA AFFINIS)

| Compound | 24 hr. | 48 hr. | 72 hr. |
|---|---|---|---|
| Malathion | 4.75 | 4.75 | 4.40 |
| Naled | 1,364 | 1,364 | 1,313 |
| 25% MEA in DPGME | 1,840 | 1,800 | 1,791 |
| 10:1 25% MEA in DPGME:95% malathion | 2,282 | 2,182 | 2,150 |
| 10:1 12.5% MEA in DPGME:85% naled | 2,308 | 2,109 | 2,009 |

As disclosed and illustrated above, it will be apparent that a solution has been formulated which not only destroys the organophosphorus insecticide (Table 1), but the resulting solution of insecticide and decontaminant is less toxic (Table 2). In the latter case it will be evident from an ecological standpoint that when the decontaminant of the present invention is brought into contact with the spillage of strong solutions of the above described organophosphorus insecticide which occur around aircraft used for insecticide spraying and spray equipment in general, the resulting mixture of decontaminant and insecticide can be readily hosed away with water without having the resulting run off deleteriously affecting any nearby streams and the fishlife therein.

A further advantage noted with respect to the decontaminating formulations of Table 1 was that they were noncorrosive with respect to aircraft type aluminum 7075 and aluminum 2024 which are well known aluminum alloys used in the construction of an airplane such as the fuselage.

Solvents other than dipropylene glycol monomethyl ether which can be employed but which are not as effective include 2-propanol, butanol, propylene glycol and other related solvents.

As will be apparent to those skilled in the art, various applications of the present invention can be made with respect to other organophosphorus insecticides in the light of the foregoing disclosure and discussion without departing from the spirit or scope of the invention.

I claim:

1. A method of decontaminating an organophosphorus insecticide comprising the steps of (1) exposing said insecticide in a volume-to-volume ratio of ten parts of a decontaminant to one part of the insecticide, said decontaminant consisting essentially of 12.5%–25% by volume of monoethanolamine in dipropylene glycol monomethyl ether as a solvent and (2) continuing said exposure for at least 30 minutes.

2. The method of claim 1 in which the insecticides are selected from the group consisting of malathion, naled, TEPP and DDVP.

References Cited

UNITED STATES PATENTS 3,689,605  9/1972  Santi _____ 424—213 X
3,314,851  4/1967  Craig _____ 424—213 X MICHAEL ROGERS, Primary Examiner U.S. Cl. X.R.

252—158, 193; 424—213